(12) United States Patent
Sporrer et al.

(10) Patent No.: US 11,064,643 B2
(45) Date of Patent: Jul. 20, 2021

(54) IMPLEMENT TOOL ANGLE CONTROL SYSTEM

(71) Applicant: Deere & Company, Moline, IL (US)

(72) Inventors: Adam D. Sporrer, Huxley, IA (US); Shawn J. Becker, Centralia, KS (US); Lucas B. Larsen, Ankeny, IA (US); Ricky B. Theilen, Bettendorf, IA (US)

(73) Assignee: Deere & Company, Moline, IL (US)

( * ) Notice: Subject to any disclaimer, the term of this patent is extended or adjusted under 35 U.S.C. 154(b) by 172 days.

(21) Appl. No.: 15/999,159

(22) Filed: Aug. 17, 2018

(65) Prior Publication Data

US 2020/0053941 A1 Feb. 20, 2020

(51) Int. Cl.

| A01B 63/10 | (2006.01) |
|---|---|
| A01B 63/00 | (2006.01) |
| A01B 23/04 | (2006.01) |
| A01B 21/08 | (2006.01) |
| A01B 5/04 | (2006.01) |
| A01B 79/00 | (2006.01) |

(52) U.S. Cl.
CPC ............ *A01B 63/002* (2013.01); *A01B 63/10* (2013.01); *A01B 5/04* (2013.01); *A01B 21/08* (2013.01); *A01B 23/046* (2013.01); *A01B 79/005* (2013.01)

(58) Field of Classification Search
CPC ... A01B 21/083; A01B 21/086; A01B 63/002; A01B 63/10
USPC ........................................................ 172/320
See application file for complete search history.

(56) References Cited

U.S. PATENT DOCUMENTS

| 4,180,135 A * | 12/1979 | Birkenbach .......... A01B 21/083 172/398 |
|---|---|---|
| 6,070,673 A † | 6/2000 | Wendte |
| 6,612,381 B2 | 9/2003 | Powell et al. |
| 8,534,374 B2 | 9/2013 | Hake et al. |
| 8,746,361 B2 * | 6/2014 | Hake ...................... A01B 21/08 172/581 |
| 9,668,399 B2 † | 6/2017 | Gates |
| 10,251,328 B2 * | 4/2019 | Gerber ................... A01B 63/32 |
| 10,342,171 B2 * | 7/2019 | Knobloch .............. A01B 19/10 |
| 10,448,554 B2 * | 10/2019 | Gerber ................... A01B 23/02 |

(Continued)

*Primary Examiner* — Gary S Hartmann
(74) *Attorney, Agent, or Firm* — Wesley W. Malherek; Kelly, Holt & Christenson PLLC

(57) ABSTRACT

An agricultural implement includes a plurality of ground-engaging tools configured to modify a surface configuration of an agricultural field and a hydraulically-controlled subsystem configured to modify an operating angle of the plurality of ground-engaging tools. The agricultural implement also includes a sensor coupled to the hydraulically-controlled subsystem configured to generate sensor signals indicative of a current operating angle of the plurality of ground-engaging tools. The agricultural implement also includes an implement control system configured to receive the sensor signals from the sensor to determine the current operating angle of the plurality of ground-engaging tools, and, upon determining the current operating angle is to be changed to a new operating angle, generate control signals for the hydraulically-controlled subsystem to modify the operating angle of the plurality of ground-engaging tools from the current operating angle to the new operating angle.

20 Claims, 8 Drawing Sheets

(56) References Cited

U.S. PATENT DOCUMENTS

| | | | |
|---|---|---|---|
| 2008/0230243 A1* | 9/2008 | Evin | A01B 21/086 |
| | | | 172/569 |
| 2015/0163988 A1* | 6/2015 | Swanson | A01B 21/086 |
| | | | 172/569 |
| 2017/0112043 A1† | 4/2017 | Nair | |
| 2020/0053946 A1* | 2/2020 | Ruckle | A01B 63/002 |
| 2020/0053947 A1* | 2/2020 | Ruckle | A01B 76/00 |

\* cited by examiner
† cited by third party

IMPLEMENT TOOL ANGLE CONTROL SYSTEM

FIELD OF THE DESCRIPTION

The present description relates to a control system for an agricultural implement. More specifically, the present description relates to a tool angle control system for an agricultural implement that monitors and controls an operating angle of various tools on the agricultural implement.

BACKGROUND

There are many types of implements that are hydraulically-powered by a support vehicle (e.g., a tractor) or other support machine. Further, implements are utilized in a variety of applications. For example, in agricultural applications, an agricultural implement can be towed by the support vehicle and includes tools for operations such as tillage, planting, spraying, baling, etc.

In a tillage operation, an agricultural implement can include a number of ground-engaging tools (e.g., gangs) that, in operation, engage and prepare an agricultural field for a subsequent agricultural operation. A gang of tools refers to a set of tools that move together as a unit and, as such, are often mounted to the same frame or subframe of an implement. For example, a disc gang can include a plurality of separate disc blades mounted to a common subframe so that the angle of operation of the plurality of disc blades is the same.

Operations performed by gangs of tools can include breaking up ground, turning soil and/or eradicating weeds (or other things) prior to conducting a planting operation. In operation, the implement can be towed across the agricultural field by the support vehicle in which the number of ground-engaging tools come into contact with and alter a surface configuration of the ground. The ground-engaging tools can engage the ground at different angles relative to the direction of travel. The different angles can determine the aggressiveness of the operation.

The discussion above is merely provided for general background information and is not intended to be used as an aid in determining the scope of the claimed subject matter.

SUMMARY

An agricultural implement includes a plurality of ground-engaging tools configured to modify a surface configuration of an agricultural field and a hydraulically-controlled subsystem configured to modify an operating angle of the plurality of ground-engaging tools. The agricultural implement also includes a sensor coupled to the hydraulically-controlled subsystem configured to generate sensor signals indicative of a current operating angle of the plurality of ground-engaging tools. The agricultural implement also includes an implement control system configured to receive the sensor signals from the sensor to determine the current operating angle of the plurality of ground-engaging tools, and, upon determining that the current operating angle is to be changed to a new operating angle, generates control signals for the hydraulically-controlled subsystem to modify the operating angle of the plurality of ground-engaging tools from the current operating angle to the new operating angle.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

During a tillage operation, an agricultural implement having one or more ground-engaging tools (e.g., disk blades) can be coupled to a support vehicle (e.g., tractor) and towed over an agricultural field in which the tool(s) alter a configuration of the ground for a subsequent agricultural operation. However, as the implement is towed through the agricultural field, it can be important to monitor an operating depth and angle of the ground-engaging tool(s) to ensure a proper tillage operation is being carried out. For example, during a tillage operation, the ground can have a variety of configurations that, in order to be properly broken up, necessitate a particular operating angle for the ground-engaging tool(s) on the implement.

The present description proceeds with respect to an implement control system that monitors and controls an operating angle for the one or more tool(s) on the implement. While the present description will proceed with an agricultural implement having a number of ground-engaging tools that alter a surface configuration of the ground, it is contemplated that the present control system can also be utilized with a variety of other implements having other types of tool(s) as well.

Figure 1:
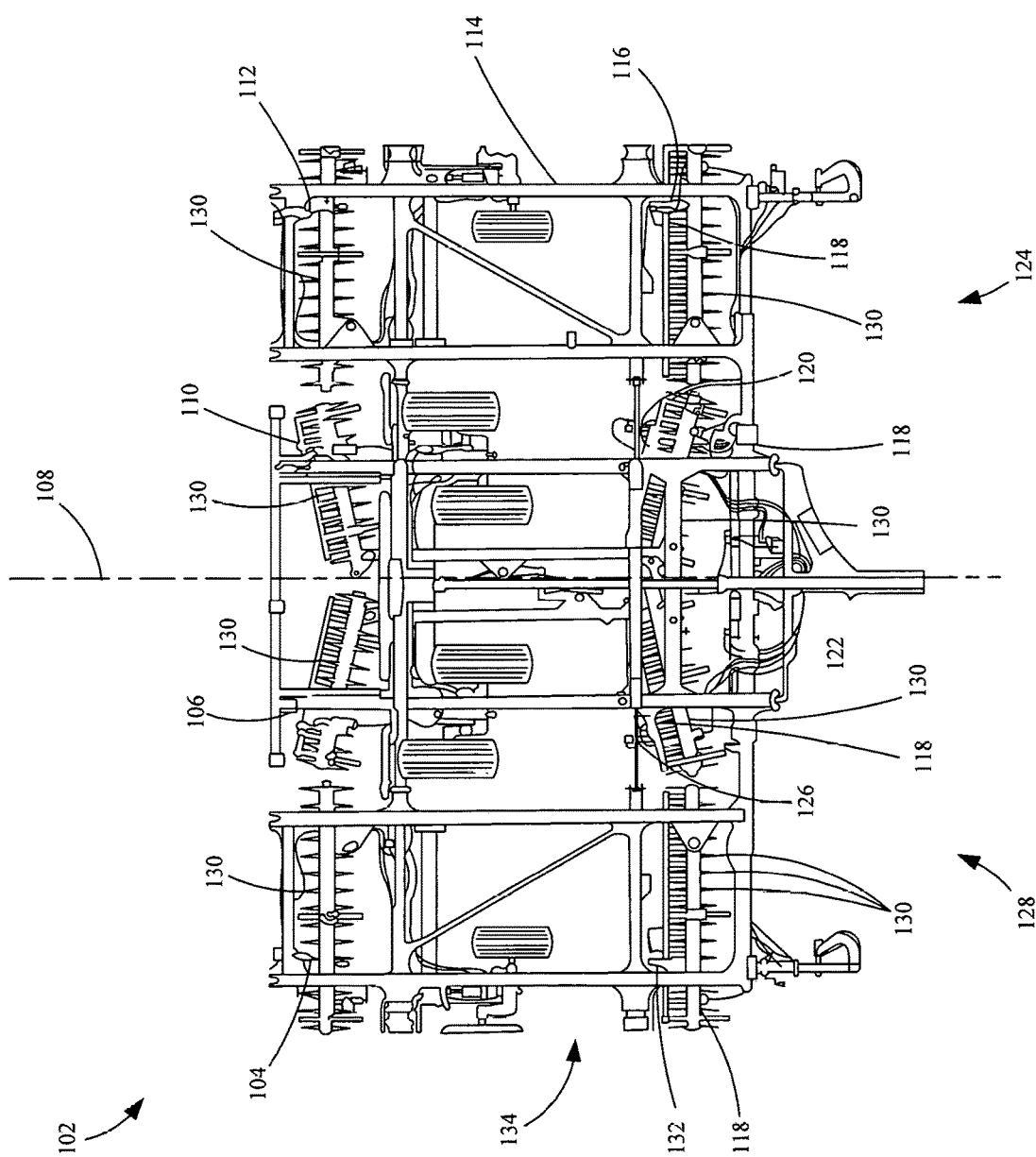
FIG. 1 illustrates one example of an agricultural implement.

FIG. 1 illustrates one example of an agricultural implement 102. Agricultural implement 102 illustratively includes a number of ground-engaging tool(s) 130 (e.g., disc blades) coupled to a frame 114, an implement control system 122 and a hydraulically-powered subsystem 134. In operation, agricultural implement 102 can be coupled to a support vehicle (e.g., tractor) and towed through an agricultural field in which tool(s) 130 alter a surface configuration of the ground. Hydraulically-powered subsystem 134 includes actuator(s) (e.g., cylinders) 104, 106, 110, 112, 116, 120, 126 and 132 that, when actuated, modify an operating angle of ground-engaging tool(s) 130. For example, subsystem 134 can receive hydraulic fluid from the support vehicle to power subsystem 134 in order to modify an operating angle of tool(s) 130. This will be discussed further with respect to FIG. 2. However, briefly, hydraulic fluid under pressure may be received from the support vehicle, split along one or more sections 128 and 124 of implement 102, as generally shown along axis 108. Based on a position of one or more valves, used to actuate one or more actuator(s) 104, 106, 110, 112, 116, 120, 126 and 132, system 134 can modify an operating angle of tool(s) 130. In operation, implement control system 122 can receive one or more sensor signals from sensor(s) 118 coupled to actuator(s) 116, 120, 126 and 132 to determine a current operating angle of tool(s) 130, and generate control signal(s) for one or more valve(s) to modify an operating angle of tool(s) 130.

While implement 102 illustratively includes eight hydraulic actuator(s), each coupled to a respective group of ground-engaging tool(s) 130 (e.g., a gang), subsystem 134 can include any number of actuator(s) or, alternatively, any type of actuators to modify an operating angle of one or more tool(s) 130. This can include utilizing electrically controlled actuators in one example. Furthermore, while the present description proceeds with respect to splitting hydraulic fluid received from a support vehicle into two sections 128 and 124, it is contemplated that the hydraulic fluid may be split into a variety of other sections on implement 102. For example, hydraulic fluid may be split along a bottom portion, generally referred to as a coupling portion, and a top portion having a number of ground-engaging devices. Furthermore, this can include splitting hydraulic fluid into quadrants. Additionally, while hydraulic fluid is received from a support vehicle, it is contemplated that hydraulic fluid can be received from a number of other sources as well, some of which are on the implement itself.

Figure 2:
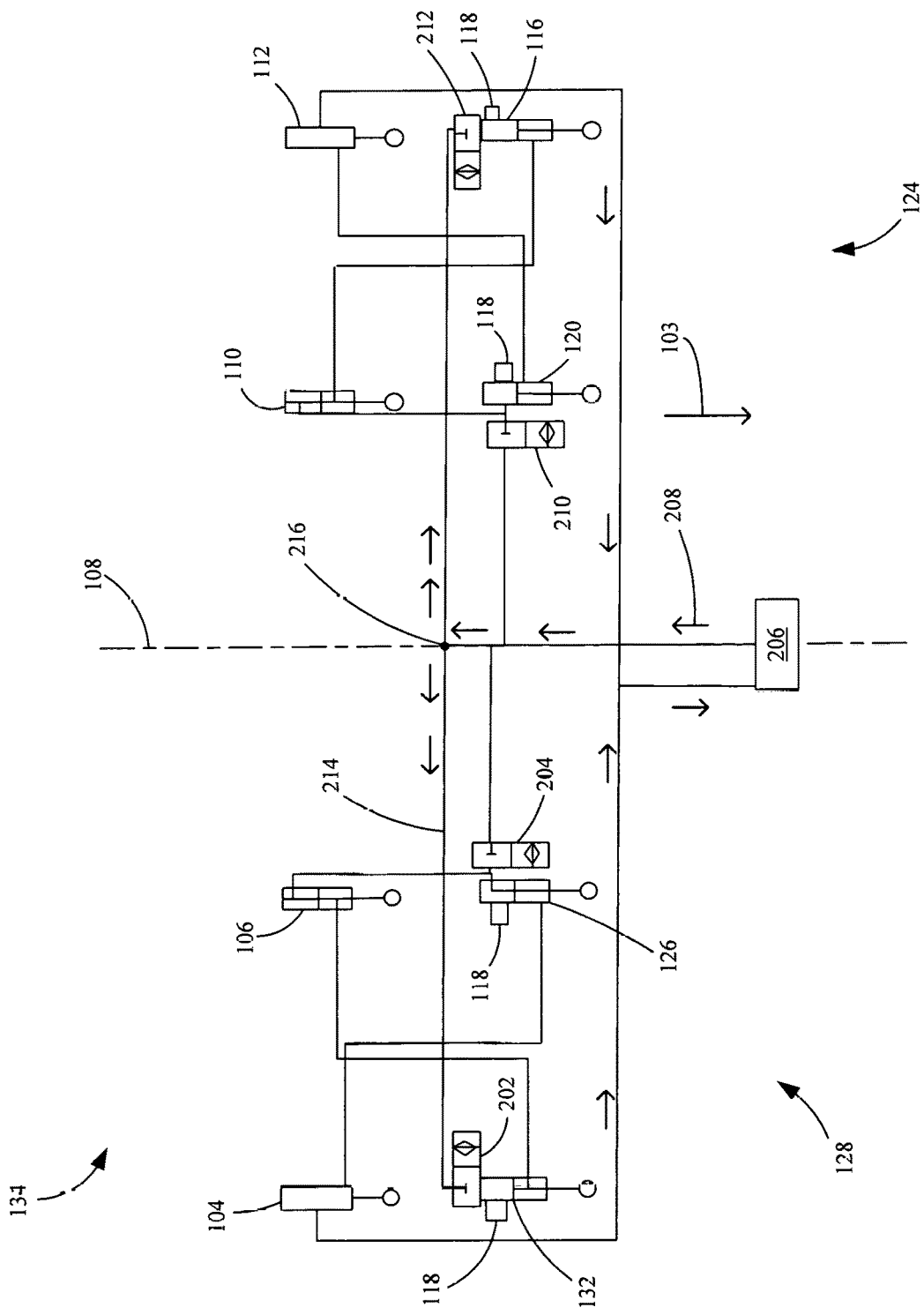
FIG. 2 illustrates one example of a hydraulic subsystem of an agricultural implement.

FIG. 2 illustrates one example of the hydraulically powered subsystem (or hydraulic subsystem) 134 of agricultural implement 102. Hydraulic subsystem 134 illustratively includes actuator(s) 104, 106, 132, 126, 110, 112, 120 and 116, valve(s) 202, 204, 210 and 212, a hydraulic source 206, sensor(s) 118 and a fluidic pathway 214. In operation, hydraulic fluid is received from hydraulic source 206 which, in one example, includes a support vehicle (e.g., tractor). The hydraulic fluid generally travels along fluidic pathway 214 in the direction as indicated by arrow 208. As is illustratively shown, the hydraulic fluid is split along axis 108 into left and right sections 128 and 124 of implement 102, respectively, at junction 216 of fluidic pathway 214. Once split, hydraulic fluid is provided along fluidic pathway 214 to valve(s) 202 and 212. In one example, valve(s) 202 and 212 include proportional valve(s) that are controlled by implement control system 122 in order to regulate an amount of hydraulic fluid flowing through each section 128 and 124 of hydraulic subsystem 134, which, in turn, drives movement of the corresponding actuators to move ground-engaging tool(s) 130 to various operating angle(s). In one example, valve(s) 202 and 212 are normally closed to maintain one or more tool(s) 130 at a particular operating angle.

However, upon determining an operating angle of one or more tool(s) 130 is to be changed, implement control system 122 generates one or more control signal(s) for valve(s) 202 and 212. As will be discussed in more detail later, a determination for changing an operating angle of one or more tool(s) 130 may be based on a user input, sensor signal(s), or based on a particular tillage operation being performed. Upon generating control signal(s) for valve(s) 202 and 212, a selected amount of hydraulic fluid flows through actuator(s) 132 and 116 to drive movement of tool(s) 130 to a desired operating angle. For section 128 of hydraulic subsystem 134, hydraulic fluid subsequently flows from actuator 132 to actuator(s) 106, 126 and 104, respectively, prior to returning to hydraulic source 206. Similarly, for section 124 of hydraulic subsystem 134, hydraulic fluid subsequently flows from actuator 116 to actuator(s) 110, 120 and 112, respectively, prior to returning to hydraulic source 206. In this manner, section(s) 128 and 124 of hydraulic subsystem 134 operate as parallel halves to modify an operating angle of one or more tool(s) 130 of implement 102. They are plumbed and arranged so that the front tools (in the direction of travel indicated by arrow 103) preferentially move soil in one direction (such as outwardly relative to axis 108) and the rear tools move it in the opposite direction (such as inwardly relative to axis 108). This is just one example.

In other examples, it is contemplated that each actuator 104, 106, 132, 126, 110, 112, 120 and 116 may have its own valve for controlling an amount of hydraulic fluid through the respective actuator. In such an example, implement control system 122 can generate control signal(s) for each valve to modify operating angles of one or more tool(s) 130. Furthermore, each respective actuator can be controlled individually allowing tool(s) 130 to have their own respective operating angles.

As hydraulic fluid flows through each section 128 and 124 of hydraulic subsystem 134, it may be desirable to modify how much fluid flows through each respective section 128 and 124. For example, once control signal(s) are generated for valve(s) 202 and 212 to change the angle of their corresponding ground-engaging elements, hydraulic fluid may flow through each section 128 and 124 at differing rates. This means that one section 124 or 128 will be moving more quickly to the new angle than the other section. This can be due to external factor(s) affecting a rate at which actuator(s) are able to modify an operating angle for tool(s) 130. For instance, if the soil over which section 128 is traveling is harder than that over which section 124 is traveling, this may cause more fluid to be directed to one of the sections than the other because the fluid will follow the path of least resistance. As such, implement control system 122 also monitor(s) a change of position for each section 128 and 124, and, if the positions differ, indicating that section(s) 128 and 124 are not in synchronization as they move to the new operating angle, implement control system 122 generate(s) control signal(s) for valve(s) 202 and 212 to modify a rate of flow through each valve 202 and 212 to keep the positions of the two sections 124 and 128 relatively similar. In this manner, each respective section 128 and 124 of hydraulic subsystem 134 can be kept in sync during movement of tool(s) 130 to the new operating angle.

In one example, to monitor the positions or angles of each section 128 and 124, a current operating angle of tool(s) 130 is sensed. Sensor(s) 118 are coupled to one or more actuator(s) 132, 126, 120 and 116 to sense the position of the corresponding actuators, which can be used to identify the operating angles of the tools 130 on each section 124 and 128. While sensor(s) 118 are illustratively coupled to actuator(s) 132, 126, 120 and 116, it is expressly contemplated that fewer or additional sensor(s) may be coupled to any or all of actuator(s) 104, 106, 132, 126, 110, 112, 120 and 116. Further, sensor(s) 118 can include camera(s), distance measuring sensor(s), RADAR, LIDAR, ultrasonic sensors, among a variety of other types of sensor(s). Based on received sensor signal(s) indicating a position of actuator(s) 132, 126, 129 and 116, implement control system 122 determines a current operating angle for one or more tool(s) 130 and can further determine a rate of change of position of one or more tool(s) 130 to determine whether section(s)

128 and 124 are in synchronization. This will be discussed further with respect to FIG. 6.

However, once section(s) 124 and 128 reach a desired setpoint position value as determined by implement control system 122, implement control system 122 generates control signal(s) to close valve(s) 202 and 212. Once those valves are closed, implement control system 122 determines whether any error exists based on a desired operating angle for tool(s) 130. If error exists indicating one or more tool(s) 130 are not correctly positioned at the desired operating angle, implement control system 122 generates control signals for correction valve(s) 204 and/or 210. In one example, correction valve(s) 204 and 210 allow for additional hydraulic fluid to be received by actuator(s) 126, 104, 120 and 112, respectively, to correctly position tool(s) 130 at a desired operating angle.

That is, actuators 116, 110, 120 and 112 are plumbed in series, in that order, on side 124. Actuators 132, 106, 126 and 104 are plumbed in series, in that order, on side 128. The actuators on the two sides, 124 and 128 are moved to a desired overall position (operating angle) in a synchronized fashion by controlling the flow of hydraulic fluid to each side 124, 128 using proportional valves 212 and 202 as well as the position sensor signals. However, over time, it may be that the positions of tools 130 driven by the actuators (even or the same side of implement 124) may drift relative to one another. This introduces error in the operating angles of the various gangs. For instance, it may be that, over time, the operating angle of the gangs of tools driven by actuators 120 and 112 may drift relative to the operating angle of the gangs of tools driven by actuators 116 and 110. Therefore, the error correction valve 210 is provided halfway through the series connection of actuators 116, 110, 120 and 112. Hence, control system 122 can generate a control signal to control correction valve 210 so that it adjusts the positions of actuators 120 and 112 (and the gangs of tools 130 driven by them) relative to the actuators 116 and 110 (and the gangs of tools 130 driven by them). The same is true for correction valve 204 on side 128. It can be controlled by control system 122 to adjust the position of actuators 126 and 104 (and their gangs of tools) relative to actuators 132 and 106 (and their gangs of tools).

Figure 3:
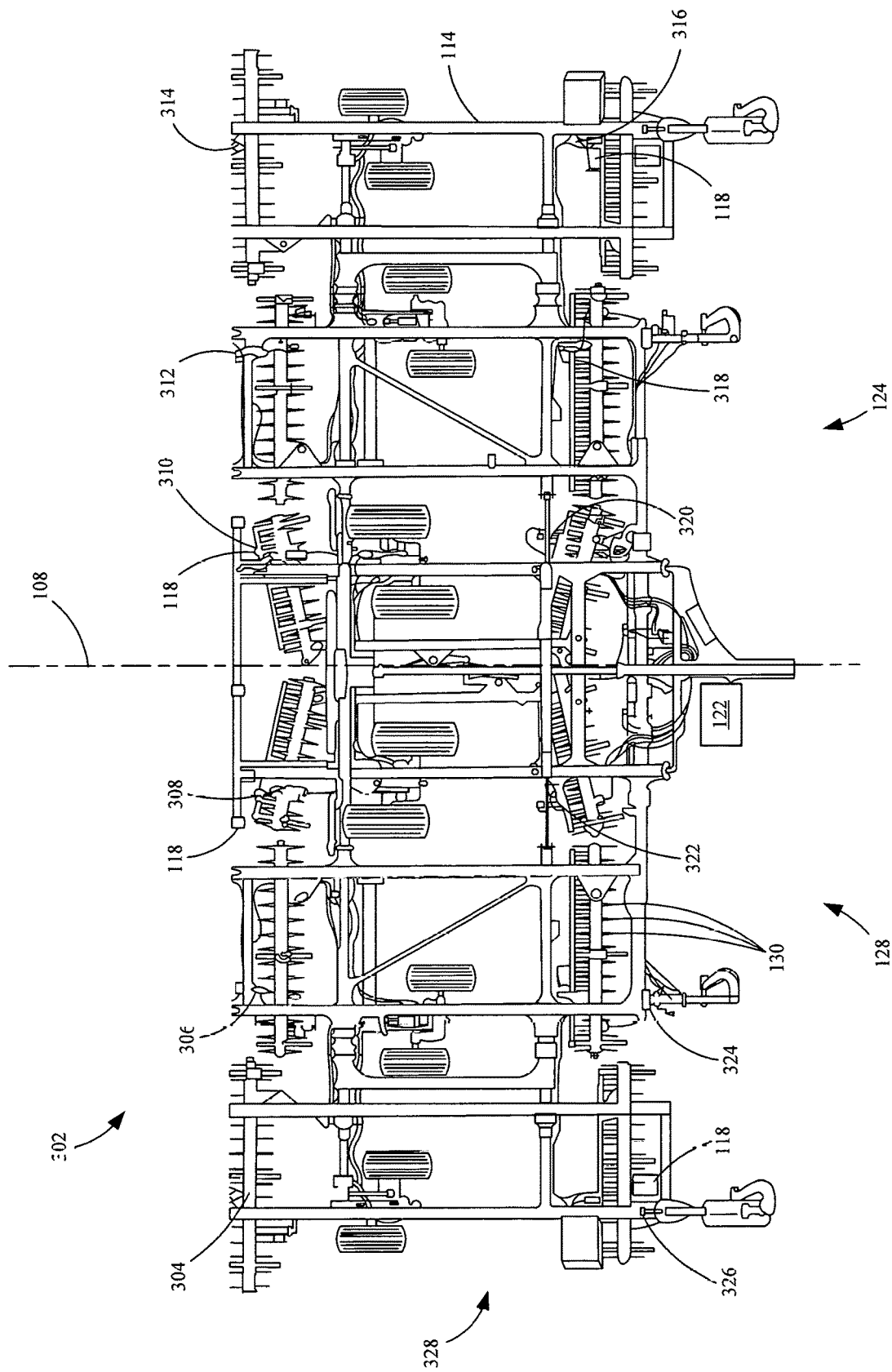
FIG. 3 illustrates another example of an agricultural implement.

FIG. 3 illustrates another example of an agricultural implement 302. Agricultural implement 302 is similar to implement 102, and, as such, includes components numbered similarly. However, as is illustratively shown, agricultural implement 302 includes additional sections (five in total) of ground engaging tool(s) 130, coupled to frame 114, that modify a surface configuration of an agricultural field. In this example, agricultural implement 302 includes a hydraulically-powered subsystem 328 that includes actuator(s) 304, 306, 308, 310, 312, 314, 316, 318, 320, 322, 324 and 326, each of which drive movement of a different gang of tool(s) 130 to position them at different operating angle(s).

Figure 4:
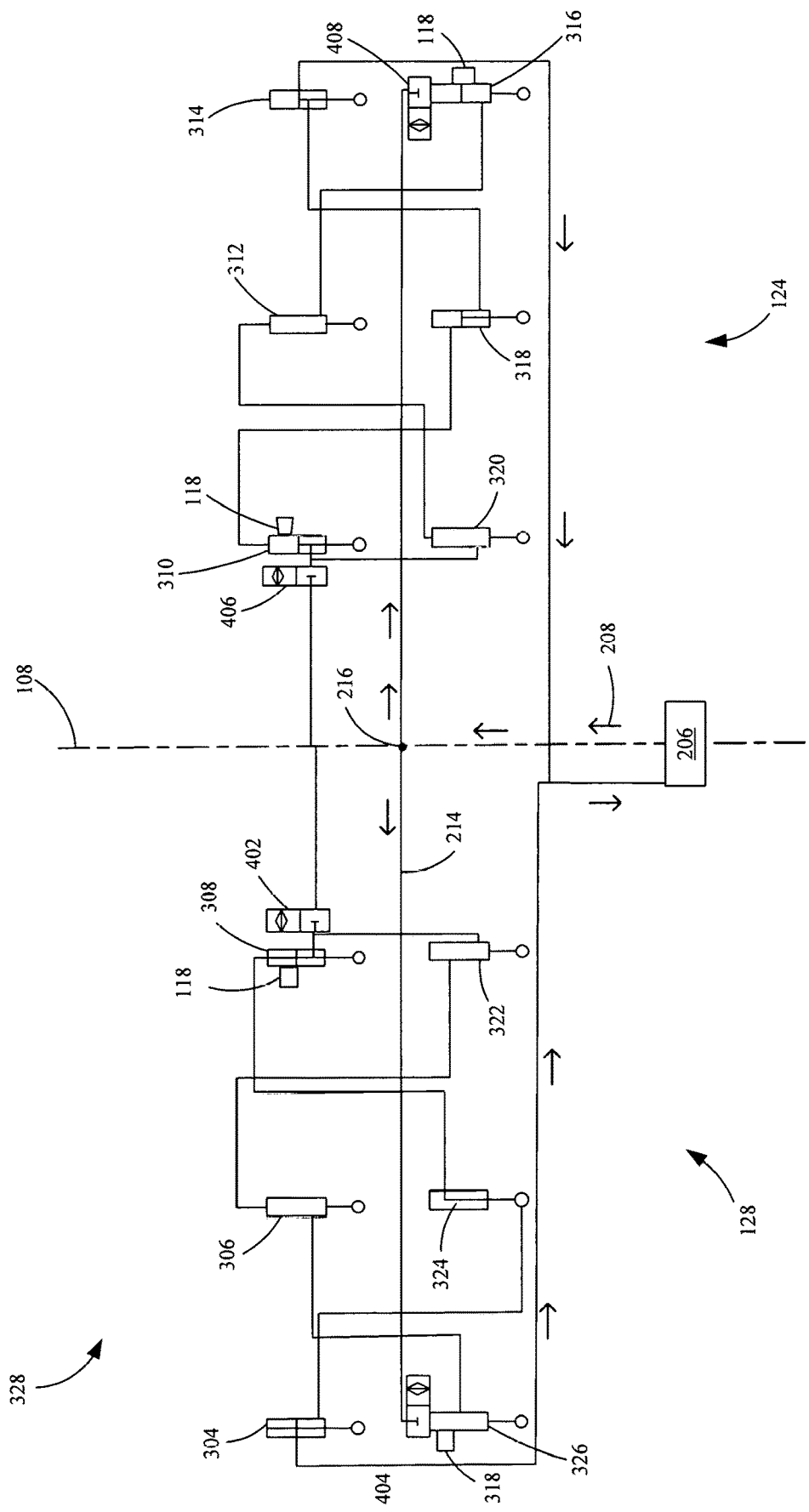
FIG. 4 illustrates another example of a hydraulic subsystem of an agricultural implement.

FIG. 4 illustrates another example of the hydraulically powered (or hydraulic) subsystem 328 of agricultural implement 302. Hydraulic subsystem 328 illustratively includes hydraulic source 206, fluidic pathway 214, valve(s) 402, 404, 406 and 408, sensor(s) 118 and actuator(s) 304, 306, 308, 310, 312, 314, 316, 318, 320, 322, 324 and 326. Hydraulic subsystem 328 is similar to hydraulic subsystem 134, and, as such, includes components numbered similarly.

In operation, hydraulic fluid is received from hydraulic source 206 along fluidic pathway 214 generally in the direction as indicated by block 208. Upon being split at junction 216 of fluidic pathway 214, hydraulic fluid travels to valve(s) 404 and 408 within sections 128 and 124, respectively. Implement control system 122, upon receiving an input to modify an operating angle of one or more tool(s) 130, generates control signals for valves 404 and/or 408. In section 128, hydraulic fluid is then provided to actuator(s) 326, 306, 322, 308, 324 and 304, respectively, prior to returning to hydraulic source 206. Similarly, in section 124, hydraulic fluid is provided to actuator(s) 316, 312, 320, 310, 318 and 314, respectively, prior to returning to hydraulic source 206.

During actuation of actuator(s) 304, 306, 308, 310, 312, 314, 316, 318, 320, 322, 324 and 326, implement control system 122 monitors position changes for each section 128 and 124 to determine whether the parallel sections are moving in sync with one another. If they are not in sync, implement control system 122 generate(s) control signals to valve(s) 404 and/or 408 to modify a rate of fluid flow through each section. Once the actuators reach their respective desired positions, implement control system 122 generates control signal(s) to close valve(s) 404 and 408. Based on a determination as to whether any error exists between an actual operating angle and a desired operating angle (within either section 124 or 128), implement control system 122 generates control signals for correction valve(s) 402 and 406. Valve(s) 402 and 406 provide additional hydraulic fluid to actuator(s) 308, 324 and 304, in section 128, and actuator(s) 310, 318 and 314, in section 124, to remedy the identified error, as discussed above with respect to FIG. 2.

Figure 5:
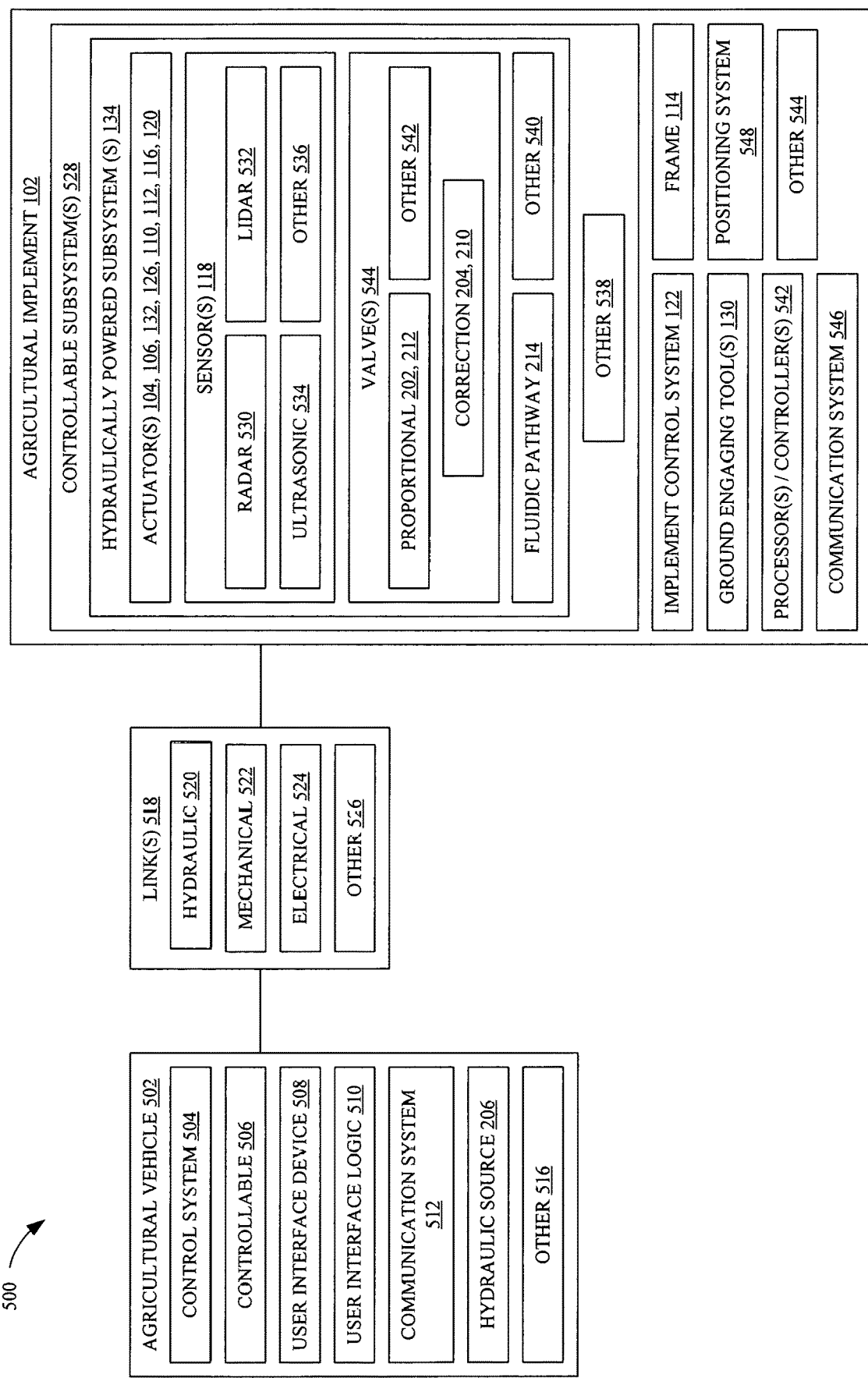
FIG. 5 is a block diagram illustrating one example of an agricultural machine.

FIG. 5 is a block diagram illustrating one example of an agricultural machine 500. Agricultural machine 500 illustratively includes an agricultural vehicle 502 (e.g., a support or towing vehicle) coupled to agricultural implement 102 over link(s) 518. While the agricultural implement discussed in FIG. 5 is illustratively agricultural implement 102, it is contemplated that the agricultural implement can be agricultural implement 302, or any other implement, in other examples.

Agricultural vehicle 502 illustratively includes a control system 504, controllable subsystems 506, a user interface device 508, user interface logic 510, a communication system 512, hydraulic source 206, among a variety of other components 516. Before describing agricultural implement 102 in more detail, a brief description of some of the items in vehicle 502, and their operation, will first be provided.

Control system 504 can generate control signals for controlling a variety of different controllable subsystems 506 based on sensor signals generated by various sensor(s), feedback received from a remote system(s), operator inputs received through user interface device 508, or it can generate control signals in a wide variety of other ways as well. Controllable subsystems 506 can include a wide variety of subsystems which may include mechanical, electrical, hydraulic, pneumatic, computer implemented and other systems that relate to the movement of vehicle 502, the operation that is performed, and other controllable features.

Communication system 512 can include one or more communication systems that allow components of vehicle 102 to communicate with each other (such as over a controller-area-network (CAN) bus or otherwise) while also allowing components of vehicle 502 to communicate with various components of agricultural implement 102, such as implement control system 122.

User interface device 508 can include display devices, mechanical or electrical devices (e.g., a steering wheel, joysticks, pedals, levers, buttons, etc.), audio devices, haptic devices and a variety of other devices. In one example, user interface logic 510 generates an operator display on user interface device 508 which can include a display device that is integrated into an operating compartment of vehicle 502, or it can be a separate display on a separate device that can be carried by an operator (such as a laptop computer, a mobile device, etc.)

In one example, an operator of vehicle 502 can provide a user input through user interface device 508 to modify an operating angle of one or more ground engaging tool(s) 130 of implement 102. For example, a display device can display a current operating angle for gangs of tool(s) 130 to an operator of vehicle 502 as determined by implement control system 122. A user input can then be provided through user interface device 508 to command the control system 122 to modify a current operating angle of the gangs of tool(s) 130. Upon receiving the user input, implement control system 122 generates one or more control signal(s) for hydraulically powered subsystem 134 to modify the current operating angle of tool(s) 130 to the desired operating angle. However, it is also contemplated that implement control system 122 can modify an operating angle of tool(s) 130 based on a variety of other signals or inputs as well, such as a position signal indicating a position of implement 102, a soil characteristic sensor signal indicating a characteristic (e.g., moisture, compaction, soil type, etc.) of the soil over which implement 102 is traveling, among other things.

In one example, vehicle 502 includes hydraulic source 206, which, in one example, may be part of controllable subsystem(s) 506 of vehicle 502. In this example, upon coupling vehicle 502 to implement 102 using link(s) 518, hydraulic fluid under pressure can be provided from hydraulic source 206 to hydraulically powered subsystem 134. However, it is contemplated that hydraulic source 206 may include a variety of other sources as well.

Link(s) 518 can include hydraulic links 520, mechanical links 522, electrical links 524, among a variety of other links 526. In one example, link(s) 518 can be used to provide electrical, hydraulic, or mechanical power from vehicle 502 to implement 102.

Now turning to implement 102, implement 102 includes controllable subsystem(s) 528, which includes hydraulically powered subsystem 134 among a variety of other subsystems 538, ground engaging tool(s) 130 coupled to frame 114, processor(s)/controller(s) 542, positioning system 548, implement control system 122, communication system 546, among a variety of other components 544.

As previously mentioned, implement control system 122 monitors and changes an operating angle for tool(s) 130 based on controlling one or more components of hydraulically-powered subsystem 134. Hydraulically-powered subsystem 134 includes actuator(s) 104, 106, 132, 126, 110, 112, 116 and 120, sensor(s) 118, valve(s) 544 which include proportional valve(s) 202 and 212 and correction valve(s) 204 and 210, fluidic pathway 214, among a variety of other components. Sensor(s) 118 can include RADAR-based sensors 530, LIDAR-based sensors 532, ultrasonic sensors 534, among a variety of other sensors. In one example, implement control system 122 receives sensor signal(s) from sensors coupled to one or more actuators 104, 106, 132, 126, 110, 112, 116 and 120 and determines a current operating angle for tool(s) 130. In one example, sensor(s) 118 can sense a position of actuators 104, 106, 132, 126, 110, 112, 116 and 120 to determine a current operating angle, or, alternatively, can sense an angular position of different linkages that couple tool(s) 130 (or subframes supporting groups of tools 130) to frame 114.

Upon receiving an input to modify an operating angle for one or more tool(s) 130, implement control system 122 generates control signals for valve(s) 544 to allow hydraulic fluid to flow through one or more actuator(s) 104, 106, 132, 126, 110, 112, 116 and 120 to modify a current operating angle of tool(s) 130. Additionally, implement control system 122, based on received sensor signals, monitors a rate of change for tool(s) 130 (e.g., based on changes in sensed position) to ensure that multiple sections of implement 102 are moving in synchronization with each other. If one or more sections are not moving in sync, implement control system 122 can generate one or more control signals for valves 544 to modify a flow rate through valves 544 in order to move the one or more sections in sync.

Position detection system 548 can be one or more of a global positioning system (GPS) receiver, a LORAN system, a dead reckoning system, a cellular triangulation system, or other positioning system. In one example, position detection system 548 can monitor a position of agricultural machine 500 as machine 500 travels through an agricultural field. A determined position of machine 500 can then be provided to implement control system 122 in order to control an operating angle of tool(s) 130 as will be discussed further with respect to FIG. 6.

Figure 6:
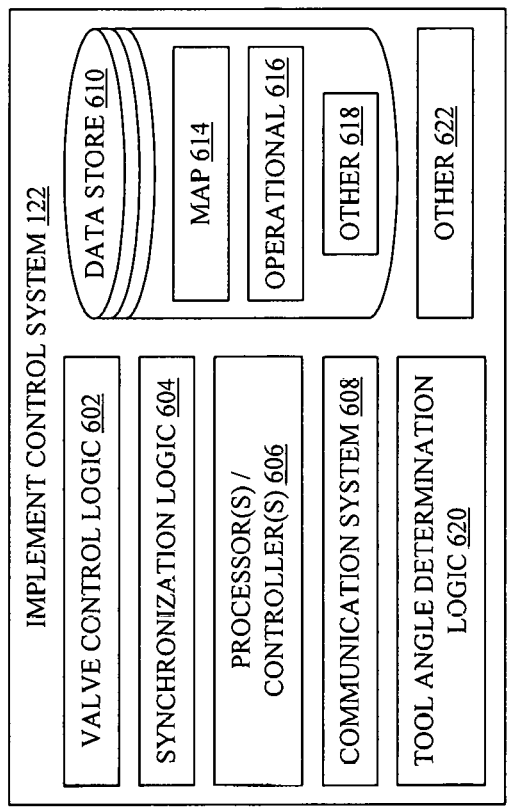
FIG. 6 is a block diagram illustrating one example of an implement control system for an agricultural implement.

FIG. 6 is a block diagram illustrating one example of an implement control system for an agricultural implement. Implement control system 122 illustratively includes valve control logic 602, synchronization logic 604, processor(s)/controller(s) 606, a communication system 608, a data store 610, tool angle determination logic 620, among a variety of other logic and components 622. It is to be understood that the logic within implement control system 122 can be carried out using processor(s)/controller(s) 606 or using a variety of other components.

Tool angle determination logic 620 receives sensor signal(s) from sensor(s) 118 coupled to one or more actuator(s) 104, 106, 132, 126, 110, 112, 116 and 120 in order to determine a current operating angle of tool(s) 130. Additionally, in operation, tool angle determination logic 620 can receive a variety of inputs indicating that an operating angle of one or more tool(s) 130 is to be changed. This can include receiving a user input, sensor signal(s) and/or other information pertaining to a tillage operation.

For example, as implement 102 traverses an agricultural field, a user can provide an input to modify an operating angle for one or more tool(s) 130 to a desired operating angle. Furthermore, tool angle determination logic 620, in other examples, can receive positioning outputs from positioning system 548 and a map 614 that shows topographical information, soil characteristics, etc. from data store 610 in order to determine the soil characteristics or topographical information for a current operating position of machine 500 within the agricultural field. Based on the received positional and map information, tool angle determination logic 620 can automatically determine whether an operating angle of one or more tool(s) 130 is to be changed. Tool angle determination logic 620 can receive a variety of other inputs to determine whether an operating angle of tool(s) 130 is to be changed as well.

However, upon determining that an operating angle for one or more tool(s) 130 is to be changed, tool angle determination logic 620 generates an output for valve control logic 602. In one example, the output is indicative of a current and desired operating angle for tool(s) 130. Based on the current and desired operating angles, valve control logic 602 generates control signals for one or more valves 544 of hydraulic subsystem 134. In one example, this can include determining a control signal for proportional valve(s) 202 and 212 that will allow a specific amount of hydraulic fluid to flow to actuator(s) 104, 106, 132, 126, 110, 112, 116 and 120 which, in turn, will change a current operating angle for tool(s) 130 to the desired operating angle.

Once control signals are provided from valve control logic 602 to valve(s) 544, synchronization logic 604 receives sensor signals from sensor(s) 118 to determine whether the section(s) of implement 102 are moving in synchronization with one another. If synchronization logic 604 determines that one or more sections are out of sync, synchronization logic 604 generates an output signal for valve control logic 602 to modify a flow rate through one or more valve(s) 544.

Once the tools 130 in the different sections reach the desired angle (as measured by tool angle determination logic 620, given sensor signals 118), valve control logic 602 generates control signal(s) to close one or more valve(s) 544 of hydraulic subsystem 134. Based on received sensor signals from sensor(s) 118, tool angle determination logic 620 then determines whether the operating angles of the different groups of tool(s) 130 in each section should be corrected. If so, an indication is provided from tool angle determination logic 620 to valve control logic 602 to generate additional correction control signals to valve(s) 544 and, in particular, correction valve(s) 204 and 210 to correct the position of the gang tool(s) 130.

Data store 610 can include any or all data pertaining to an operation of agricultural vehicle 502 and/or agricultural implement 102. In one example, data store 610 can include maps 614 for various agricultural fields, operational data 616 for implement 102, among a variety of other information 618. Any or all data within data store 610 can be provided to various components/logic within implement control system 122 in order to monitor and/or control a position of tool(s) 130.

Communication system 608 can include one or more communication systems that allow components of implement control system 122 to communicate with each other (such as over a controller-area-network (CAN) bus, ISO-BUS, or otherwise) while also allowing components of implement control system 122 to communicate with other components within implement 102 and/or agricultural vehicle 502.

Figure 7:
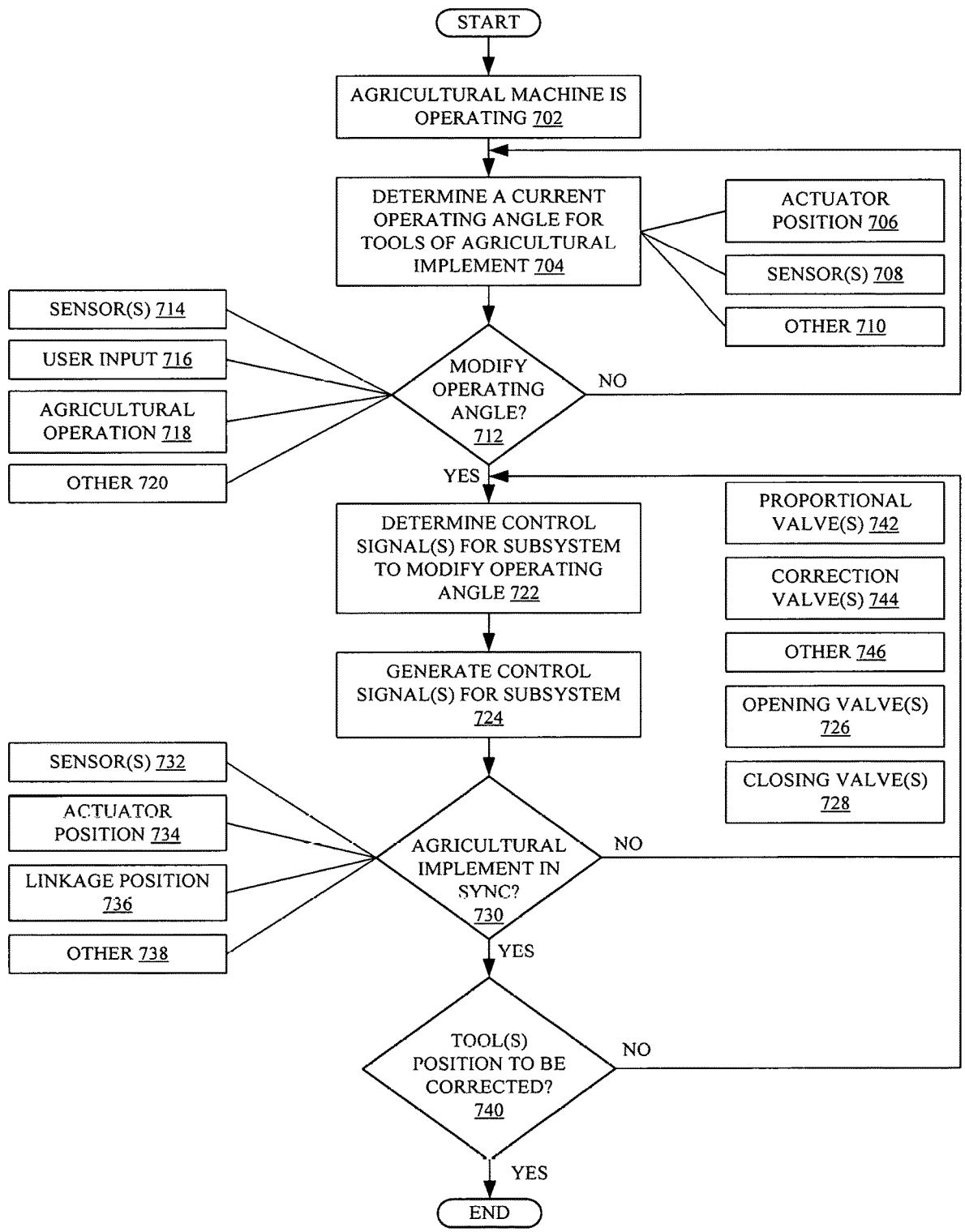
FIG. 7 is a flow diagram illustrating one example of monitoring and altering an operating angle of one or more ground-engaging tools of an agricultural implement.

FIG. 7 is a flow diagram illustrating one example of monitoring and controlling an operating angle of one or more ground-engaging tools of an agricultural implement. It is to be understood that the operation performed can be carried out at any time or at any point throughout a worksite operation, or if a worksite operation is not currently underway. Further, while the operation will be described in accordance with implement 102, it is to be understood that the operation can be utilized with implement 302, or any other implements. Processing begins at block 702 where it is initially assumed that agricultural machine 500 is operating. This can be based on a variety of inputs. For instance, an operator can provide initial machine settings (such as an initial operating angle of tools 130) based on a worksite operation. This can be based on the operators own knowledge and prior experience. The settings can be made manually, such as through mechanical or other user input mechanisms, or they can be automatically by the machine itself, or they can be input in a different way, such as through a touch screen or other user input mechanism.

During operation of machine 500, tool angle determination logic 620 receives sensor signals from sensor(s) 118 to determine a current operating angle for tool(s) 130, as indicated by block 704. In one example, the sensor signal(s) can indicate a current position of any or all actuator(s) 104, 106, 132, 126, 110, 112, 116 and/or 120 as indicated by block 706, and the operating angle of the tools 130 can be derived from that. However, in other examples, tool angle determination logic 620 can receive sensor signal(s) from additional sensor(s) coupled to frame 114 to determine a current operating angle for tool(s) 130, directly, as indicated by block 708. Tool angle determination logic 620 can determine a current operating angle based on a variety of other signals, as well, as indicated by block 710.

Processing turns to block 712 where a determination is made by tool angle determination logic 620 whether a current operating angle for tool(s) 130 is to be modified. This can be based on a received user input, as indicated by block 716, a particular agricultural operation, as indicated by block 718, received sensor signal(s) from sensor(s) 118 indicating a current operating angle does not match a desired operating angle, as indicated by block 714, based on the geographic position of them on implement in the field (along with map information 614), among a variety of other indications as indicated by block 720.

If tool angle determination logic 620 determines that the current operating angle for tool(s) 130 matches a desired operating angle for tool(s) 130, processing reverts back to block 704 where tool angle determination logic 620 continues to monitor the current operating angle of tool(s) 130. However, if tool angle determination logic 620 determines that a current operating angle is to be modified, processing proceeds to block 722 where valve control logic 602 determines necessary control signal(s) for one or more components of hydraulic subsystem 134 to move tool(s) 130 to the desired operating angle. In one example, this includes tool angle determination logic 620 generating an output for valve control logic 602 indicating a current and desired operating angle for tool(s) 130. Based on the received output from tool angle determination logic 620, valve control logic 602 can determine control signals for components of subsystem 134, that, in one example, includes determining control signals for proportional valves 202 and 212 as indicated by block 742. However, this can also include determining control signals for correction valve(s) 204 and 210, as indicated by block 744, among a variety of other components as indicated by block 746.

Once valve control logic 602 determines the necessary control signals to position tool(s) 130 at the desired operating angle, processing turns to block 724 where valve control logic 602 generates the control signal(s) for subsystem 134. In one example, the generated control signal(s) are provided to proportional valves 202 and 212 to allow a desired amount of hydraulic fluid to flow to actuator(s) 104, 106, 132, 126, 110, 112, 116 and 120, as indicated by block 726. However, control signal(s) can also close one or more valve(s) 544 as indicated by block 728.

A determination is then made, as indicated by block 730, by synchronization logic 604 as to whether sections 128 and 124 of implement 102 are moving in sync as the actuator(s) 104, 106, 132, 126, 110, 112, 116 and 120 move tool(s) 130 from a current operating angle to the desired operating angle. In one example, synchronization logic 604 receives sensor signal(s) from sensor(s) 118, as indicated by block 732, to determine whether the various rates of change in position across sections 128 and 124 are similar. Additionally, this can also include determining a position and rate of change for actuator(s) 104, 106, 132, 126, 110, 112, 116 and 120 relative to each other as indicated by block 734. However, in other examples, sensor signals may be received by additional or different sensor(s) coupled to frame 114 that monitor a rate of change in position for various linkages as indicated by block 736. Synchronization logic 604 can use a variety of other information to determine a synchronization of section(s) 128 and 124, as indicated by block 738.

If synchronization logic 604 determines that section(s) 128 and 124 are not in synchronization, processing reverts to block 722 where valve control logic 602 determines additional control signals for one or more components of subsystem 134 to move the respective sections 128 and 124 in sync. This can include modifying a rate of fluid flow through valve(s) 544 in one example. However, if sections 128 and 124 are in sync, processing turns to block 740 where tool angle determination logic 620 receives sensor signal(s) from sensor(s) 118 to determine whether a current operating angle for tool(s) 130, within a section 124 or 128 is to be corrected. If tool angle determination logic 620 determines a current angular position of tool(s) 130 is to be corrected, processing reverts to block 722 where valve control logic 602 determines additional control signal(s) for components of subsystem 134 (such as the correction valves) in order to place tool(s) 130 at the desired operating angle.

However, if tool angle determination logic 620 determines a desired operating angle matches a current operating angle, processing subsequently ends. The system can continue to monitor and correct tool position as well.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Figure 8:
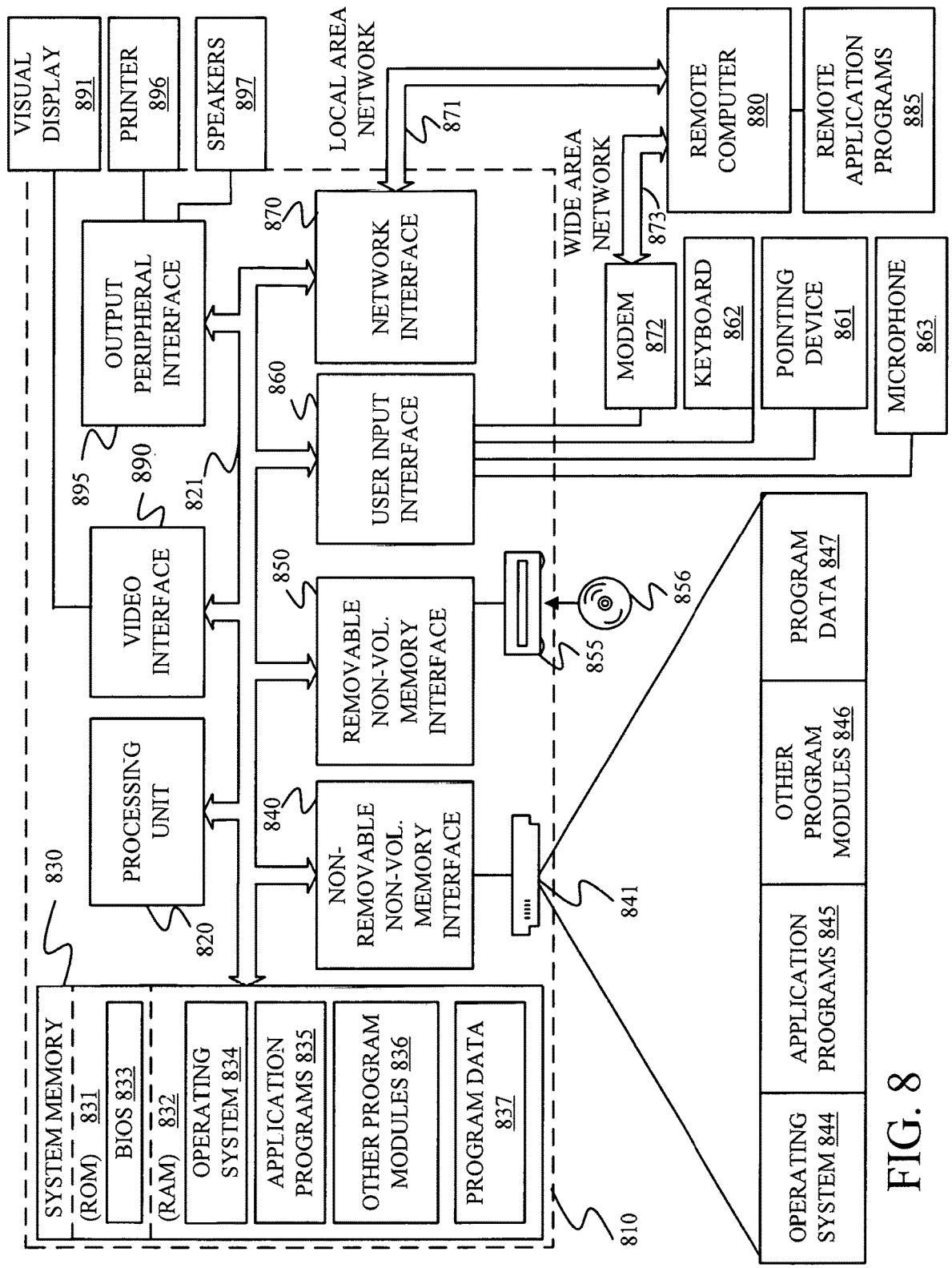
FIG. 8 is a block diagram illustrating one example of a computing environment that can be deployed in any of the machines, systems, and/or architectures shown in previous figures.

FIG. 8 is a block diagram of one example of a computing environment. With reference to FIG. 8, an example system for implementing some embodiments includes a general-purpose computing device in the form of a computer 810. Components of computer 810 may include, but are not limited to, a processing unit 820 (which can comprise processors or servers from other FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIGS. 5-6 can be deployed in corresponding portions of FIG. 8.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include foot pedals, steering wheels, levers, buttons, a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 8 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is an agricultural implement, comprising: a plurality of ground-engaging tools configured to modify a surface configuration of an agricultural field;
  a hydraulically-controlled subsystem configured to modify an operating angle of the plurality of ground-engaging tools;
  a sensor coupled to the hydraulically-controlled subsystem configured to generate sensor signals indicative of a current operating angle of the plurality of ground-engaging tools; and
  an implement control system configured to receive the sensor signals from the sensor to determine the current operating angle of the plurality of ground-engaging tools, and, upon determining the current operating angle is to be changed to a new operating angle, generate control signals for the hydraulically-controlled subsystem to modify the operating angle of the plurality of ground-engaging tools from the current operating angle to the new operating angle.

Example 2 is the agricultural implement of any or all previous examples, wherein the hydraulically-controlled subsystem comprises:
  a fluidic pathway configured to receive a flow of hydraulic fluid;
  a plurality of actuators coupled to the fluidic pathway configured to modify the operating angle of the plurality of ground-engaging tools; and
  a plurality of valves configured to regulate the flow of hydraulic fluid through the plurality of actuators.

Example 3 is the agricultural implement of any or all previous examples, wherein the plurality of valves comprise proportional valves configured to receive the generated control signals from the implement control system to modify the operating angle of the plurality of ground-engaging tools.

Example 4 is the agricultural implement of any or all previous examples, wherein the plurality of valves further comprise correction valves configured to receive the generated control signals from the implement control system to modify the operating angle of the plurality of ground-engaging tools.

Example 5 is the agricultural implement of any or all previous examples, wherein the fluidic pathway comprises a junction configured to split the flow of hydraulic fluid into multiple sections within the fluidic pathway of the agricultural implement.

Example 6 is the agricultural implement of any or all previous examples, wherein the multiple sections comprise a first and a second section configured to receive the flow of hydraulic fluid, the first section comprising:
  a first and a second serially plumbed hydraulic actuator within the plurality of actuators configured to receive the flow of hydraulic fluid from a first of the proportional valves along the fluidic pathway to drive movement of one or more of the plurality of ground-engaging tools; and
  a first correction valve coupled to the second serially plumbed hydraulic actuator to provide an additional flow of hydraulic fluid to the second serially plumbed hydraulic actuator to drive movement of the second serially plumbed hydraulic actuator relative to the first serially plumbed hydraulic actuator.

Example 7 is the agricultural implement of any or all previous examples, wherein the second section comprises:
  a third and a fourth serially plumbed hydraulic actuator within the plurality of actuators configured to receive the flow of hydraulic fluid from a second of the proportional valves along the fluidic pathway to drive movement of one or more of the plurality of ground-engaging tools; and
  a second correction valve coupled to the fourth serially plumbed hydraulic actuator to provide an additional flow of hydraulic fluid to the fourth serially plumbed hydraulic actuator to drive movement of the fourth serially plumbed hydraulic actuator relative to the third serially plumbed hydraulic actuator.

Example 8 is the agricultural implement of any or all previous examples, wherein the multiple sections comprise a quadrant configured to receive the flow of hydraulic fluid.

Example 9 is the agricultural implement of any or all previous examples, wherein the implement control system determines changing the current operating angle to the new operating angle based on a received user input indicating the new operating angle.

Example 10 is the agricultural implement of any or all previous examples, wherein the implement control system comprises:
  tool angle determination logic configured to receive the sensor signals from the sensor to determine the current operating angle of the plurality of ground-engaging tools, and, upon determining the operating angle is to be changed, generates a tool angle output indicative of the current operating angle and the desired operating angle.

Example 11 is the agricultural implement of any or all previous examples, wherein the implement control system further comprises:
  valve control logic configured to receive the tool angle output from the tool angle determination logic, and, based on the output, determines and generates the control signals for the hydraulically-controlled subsystem to modify the operating angle of the plurality of ground-engaging tools from the current operating angle to the new operating angle.

Example 12 is the agricultural implement of any or all previous examples, wherein the implement control system further comprises:
  synchronization logic configured to receive the sensor signals from the sensors coupled to the hydraulically-controlled subsystem and, based on the sensor signals, determine a rate of change for each section within the fluidic pathway, wherein, upon determining the rate of change, synchronization logic generates a synchronization output indicative of the rate of change for each section.

Example 13 is the agricultural implement of any or all previous examples, wherein the synchronization logic provides the synchronization output to valve control logic, and, based on whether the rate of change is substantially similar across the sections, valve control logic generates additional control signals for the plurality of valves to place each section in sync relative to each other.

Example 14 is a method of modifying an operating angle of one or more ground-engaging tools, comprising:
  determining a current operating angle for the one or more ground-engaging tools based on sensor signals received from a plurality of sensors coupled to a hydraulically-controlled subsystem configured to modify an operating angle of the one or more ground-engaging tools;
  determining that the current operating angle of the one or more ground-engaging tools is to be changed to a new operating angle; and generating control signals for the hydraulically-controlled subsystem to modify the operating angle of the one or more ground-engaging tools from the current operating angle to the new operating angle.

Example 15 is the method of any or all previous examples, further comprising:
  determining whether the current operating angle of the one or more ground-engaging tools has met the new operating angle based on the received sensor signals from the plurality of sensors.

Example 16 is the method of any or all previous examples, wherein determining the current operating angle of the one or more ground-engaging tools is to be changed comprises:
  receiving a position output from a positioning system indicative of a current operating position of an agricultural implement;
  accessing map information for the current operating position of the agricultural implement from a data store; and
  based on the map information for the current operating position, determining whether the current operating angle should be changed to the new operating angle.

Example 17 is the method of any or all previous examples, wherein the hydraulically-controlled subsystem comprises a first and second section, and generating control signals for the hydraulically-controlled subsystem comprises:
  generating control signals for a proportional valve coupled to a first and a second serially plumbed hydraulic actuator configured to receive a flow of hydraulic fluid to drive movement of the one or more ground engaging tools; and
  receiving sensor signals from the plurality of sensors coupled to the hydraulically-controlled subsystem to determine whether the current operating angle of the one or more ground engaging tools matches the new operating angle.

Example 18 is the method of any or all previous examples, wherein generating control signals for the hydraulically-controlled subsystem further comprises:
  upon determining the current operating angle of the one or more ground engaging tools does not match the new operating angle, generating control signals for a correction valve coupled to the second serially plumbed hydraulic actuator to provide an additional flow of hydraulic fluid to the second serially plumbed hydraulic actuator to drive movement of the second serially plumbed hydraulic actuator relative to the first serially plumbed hydraulic actuator.

Example 19 is an agricultural machine, comprising:
  an agricultural vehicle comprising a hydraulic fluid source; and
  an agricultural implement coupled to the agricultural vehicle configured to receive a flow of hydraulic fluid from the hydraulic fluid source, the agricultural implement comprising:
    a plurality of ground-engaging tools configured to modify a surface configuration of an agricultural field;
    a hydraulically-controlled subsystem configured to receive the flow of hydraulic fluid and modify an operating angle of the plurality of ground-engaging tools; and
    an implement control system configured to receive sensor signals from a plurality of sensors coupled to the hydraulically-powered subsystem to determine a current operating angle of the plurality of ground-engaging tools and, upon determining the current operating angle is to be changed to a different operating angle, generates control signals for the hydraulically-controlled subsystem to modify the operating angle of the plurality of ground-engaging tools from the current operating angle to the different operating angle.

Example 20 is the agricultural machine of any or all previous examples, wherein the implement control system comprises:
  tool angle determination logic configured to receive the sensor signals from the plurality of sensors to determine the current operating angle of the plurality of ground-engaging tools and whether the current operating angle is substantially similar to the different operating angle.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural implement, comprising:
  a plurality of ground-engaging tools configured to modify a surface configuration of an agricultural field;
  a hydraulically-controlled subsystem configured to modify an operating angle of the plurality of ground-engaging tools, the hydraulically-controlled subsystem comprising:
    a fluidic pathway configured to receive a flow of hydraulic fluid;
    a first and a second serially plumbed hydraulic actuator configured to receive the flow of hydraulic fluid from the fluidic pathway to drive movement of one or more of the plurality of ground-engaging tools; and
    a first correction valve coupled to the second serially plumbed hydraulic actuator to provide an additional flow of hydraulic fluid to the second serially plumbed hydraulic actuator to drive movement of the second serially plumbed hydraulic actuator relative to the first serially plumbed hydraulic actuator;

a sensor coupled to the hydraulically-controlled subsystem configured to generate sensor signals indicative of a current operating angle of the plurality of ground-engaging tools; and an implement control system configured to receive the sensor signals from the sensor to determine the current operating angle of the plurality of ground-engaging tools, and, upon determining the current operating angle is to be changed to a new operating angle, generate control signals for the hydraulically-controlled subsystem to modify the operating angle of the plurality of ground-engaging tools from the current operating angle to the new operating angle.

2. The agricultural implement of claim 1, wherein the hydraulically-controlled subsystem comprises:

a plurality of actuators, including the first and the second serially plumbed hydraulic actuators, coupled to the fluidic pathway configured to modify the operating angle of the plurality of ground-engaging tools; and a plurality of valves configured to regulate the flow of hydraulic fluid through the plurality of actuators.

3. The agricultural implement of claim 2, wherein the plurality of valves comprise proportional valves configured to receive the generated control signals from the implement control system to modify the operating angle of the plurality of ground-engaging tools.

4. The agricultural implement of claim 3, wherein the plurality of valves further comprise correction valves configured to receive the generated control signals from the implement control system to modify the operating angle of the plurality of ground-engaging tools.

5. The agricultural implement of claim 4, wherein the fluidic pathway comprises a junction configured to split the flow of hydraulic fluid into multiple sections within the fluidic pathway of the agricultural implement.

6. The agricultural implement of claim 5, wherein the multiple sections comprise a first and a second section configured to receive the flow of hydraulic fluid, the first section comprising:

the first and the second serially plumbed hydraulic actuators.

7. The agricultural implement of claim 6, wherein the second section comprises:

a third and a fourth serially plumbed hydraulic actuator within the plurality of actuators configured to receive the flow of hydraulic fluid from a second of the proportional valves along the fluidic pathway to drive movement of one or more of the plurality of ground-engaging tools; and a second correction valve coupled to the fourth serially plumbed hydraulic actuator to provide an additional flow of hydraulic fluid to the fourth serially plumbed hydraulic actuator to drive movement of the fourth serially plumbed hydraulic actuator relative to the third serially plumbed hydraulic actuator.

8. The agricultural implement of claim 5, wherein the multiple sections comprise a quadrant configured to receive the flow of hydraulic fluid.

9. The agricultural implement of claim 1, wherein the implement control system determines changing the current operating angle to the new operating angle based on a received user input indicating the new operating angle.

10. The agricultural implement of claim 1, wherein the implement control system comprises:

tool angle determination logic configured to receive the sensor signals from the sensor to determine the current operating angle of the plurality of ground-engaging tools, and, upon determining the operating angle is to be changed, generates a tool angle output indicative of the current operating angle and the desired operating angle.

11. The agricultural implement of claim 10, wherein the implement control system further comprises:

valve control logic configured to receive the tool angle output from the tool angle determination logic, and, based on the output, determines and generates the control signals for the hydraulically-controlled subsystem to modify the operating angle of the plurality of ground-engaging tools from the current operating angle to the new operating angle.

12. The agricultural implement of claim 5, wherein the implement control system further comprises:

synchronization logic configured to receive the sensor signals from the sensors coupled to the hydraulically-controlled subsystem and, based on the sensor signals, determine a rate of change for each section within the fluidic pathway, wherein, upon determining the rate of change, synchronization logic generates a synchronization output indicative of the rate of change for each section.

13. The agricultural implement of claim 12, wherein the synchronization logic provides the synchronization output to valve control logic, and, based on whether the rate of change is substantially similar across the sections, valve control logic generates additional control signals for the plurality of valves to place each section in sync relative to each other.

14. A method of modifying an operating angle of one or more ground-engaging tools, comprising:

determining a current operating angle for the one or more ground-engaging tools based on sensor signals received from a plurality of sensors coupled to a hydraulically-controlled subsystem configured to modify an operating angle of the one or more ground-engaging tools;

determining that the current operating angle of the one or more ground-engaging tools is to be changed to a new operating angle; and generating control signals for the hydraulically-controlled subsystem to modify the operating angle of the one or more ground-engaging tools from the current operating angle to the new operating angle, generating control signals for the hydraulically-controlled subsystem comprising:

generating control signals for a valve coupled to a first and a second serially plumbed hydraulic actuator configured to receive a flow of hydraulic fluid to drive movement of the one or more ground engaging tools;

receiving sensor signals from the plurality of sensors coupled to the hydraulically-controlled subsystem to determine whether the current operating angle of the one or more ground engaging tools matches the new operating angle; and upon determining, the current operating angle of the one or more around engaging tools does not match the new operating angle, generating control signals for a correction valve coupled to the second serially plumbed hydraulic actuator to provide an additional flow of hydraulic fluid to the second serially plumbed hydraulic actuator to drive movement of the second serially plumbed hydraulic actuator relative to the first serially plumbed hydraulic actuator.

15. The method of claim 14, further comprising:

determining whether the current operating angle of the one or more ground-engaging tools has met the new operating angle based on the received sensor signals from the plurality of sensors.

16. The method of claim 14, wherein determining the current operating angle of the one or more ground-engaging tools is to be changed comprises:
receiving a position output from a positioning system indicative of a current operating position of an agricultural implement;
accessing map information for the current operating position of the agricultural implement from a data store; and
based on the map information for the current operating position, determining whether the current operating angle should be changed to the new operating angle.

17. The method of claim 14, wherein the hydraulically-controlled subsystem comprises a first section comprising the first and second serially plumbed hydraulic actuators and second section comprising a third hydraulic actuator, and generating control signals for the hydraulically-controlled subsystem comprises:
generating control signals for a first proportional valve coupled to the first section; and
generating control signals for a second proportional valve coupled to the second section.

18. The method of claim 14, wherein determining the current operating angle for the one or more ground-engaging tools comprises:
determining a yaw angle for the one or more ground-engaging tools that is relative to forward travel of the one or more ground-engaging tools.

19. An agricultural machine, comprising:
an agricultural vehicle comprising a hydraulic fluid source; and
an agricultural implement coupled to the agricultural vehicle configured to receive a flow of hydraulic fluid from the hydraulic fluid source, the agricultural implement comprising:
a plurality of ground-engaging tools configured to modify a surface configuration of an agricultural field;
a hydraulically-controlled subsystem configured to receive the flow of hydraulic fluid and modify an operating angle of the plurality of ground-engaging tools, wherein the hydraulically-controlled subsystem comprises:
a first and a second serially plumbed hydraulic actuator to receive the flow of hydraulic fluid to drive movement of one or more of the plurality of ground-engaging tools; and
a first correction valve coupled to the second serially plumbed hydraulic actuator to provide an additional flow of hydraulic fluid to the second serially plumbed hydraulic actuator to drive movement of the second serially plumbed hydraulic actuator relative to the first serially plumbed hydraulic actuator; and
an implement control system configured to receive sensor signals from a plurality of sensors coupled to the hydraulically-powered subsystem to determine a current operating angle of the plurality of ground-engaging tools and, upon determining the current operating angle is to be changed to a different operating angle, generates control signals for the hydraulically-controlled subsystem to modify the operating angle of at least one of the plurality of ground-engaging tools from the current operating angle to the different operating angle.

20. The agricultural machine of claim 19, wherein the implement control system comprises:
tool angle determination logic configured to receive the sensor signals from the plurality of sensors to determine the current operating angle of the plurality of ground-engaging tools and whether the current operating angle is substantially similar to the different operating angle.

* * * * *